(12) United States Patent
Lin et al.

(10) Patent No.: US 11,920,660 B2
(45) Date of Patent: Mar. 5, 2024

(54) MAGNETIC LEVITATION BALL SCREW PAIR

(71) Applicant: SHANDONG UNIVERSITY, Shandong (CN)

(72) Inventors: Mingxing Lin, Jinan (CN); Jiajia Zhao, Jinan (CN); Yanfeng Zhao, Jinan (CN); Xianchun Song, Jinan (CN); Hongkui Jiang, Jinan (CN)

(73) Assignee: SHANDONG UNIVERSITY, Jinan (CN)

( * ) Notice: Subject to any disclaimer, the term of this patent is extended or adjusted under 35 U.S.C. 154(b) by 191 days.

(21) Appl. No.: 17/619,139

(22) PCT Filed: May 12, 2021

(86) PCT No.: PCT/CN2021/093414
§ 371 (c)(1),
(2) Date: Dec. 14, 2021

(87) PCT Pub. No.: WO2022/052499
PCT Pub. Date: Mar. 17, 2022

(65) Prior Publication Data
US 2022/0356932 A1 Nov. 10, 2022

(30) Foreign Application Priority Data
Sep. 14, 2020 (CN) .......................... 202010961134.5

(51) Int. Cl.
*F16H 25/22* (2006.01)
*F16H 25/20* (2006.01)

(52) U.S. Cl.
CPC ..... *F16H 25/2204* (2013.01); *F16H 25/2006* (2013.01); *F16H 25/2015* (2013.01)

(58) Field of Classification Search
CPC ............. F16H 25/2015; F16H 25/2204; F16H 25/2009; F16H 25/2209; F16H 49/005; H02N 15/00
See application file for complete search history.

(56) References Cited

U.S. PATENT DOCUMENTS

2013/0239714 A1   9/2013  Yamanaka
2022/0042583 A1*  2/2022  Kubota ............... F16H 25/2021

FOREIGN PATENT DOCUMENTS

CN   103968024 A      8/2014
CN   104141759 A  * 11/2014   ......... F16H 25/2003
(Continued)

OTHER PUBLICATIONS

Aug. 23, 2021 Search Report issued in International Patent Application No. PCT/CN2021/093414.
(Continued)

*Primary Examiner* — Gregory Robert Weber
(74) *Attorney, Agent, or Firm* — Oliff PLC

(57) ABSTRACT

A screw pair including inner walls of screw holes in a working nut and a pre-tightening nut with sensor groups including a plurality of displacement sensors capable of measuring a value of a gap between an inner and outer wall of a screw in a diameter direction of the screw hole, the group includes four displacement sensors evenly distributed in a circumferential direction of the screw hole, every two displacement sensors are paired and symmetrical about a center axis, and projections of a plurality of sensor groups in an axial direction overlap the screw; and an adaptive excitation coil is mounted to each displacement sensor, which is capable of attracting the screw in a measurement direction of the adaptive displacement sensor, and a magnetic force of (Continued)

the coil attached is adjustable to change the value of the gap, so that axes of the screw, working nut, and pre-tightening nut coincide.

6 Claims, 3 Drawing Sheets

(56) References Cited

FOREIGN PATENT DOCUMENTS

| | | | |
|---|---|---|---|
| CN | 104141759 | A | 11/2014 |
| CN | 104565252 | A | 4/2015 |
| CN | 205960992 | U | 2/2017 |
| CN | 108916336 | A | 11/2018 |
| CN | 109210073 | A | 1/2019 |
| CN | 110207981 | A | 9/2019 |
| CN | 112096816 | A | 12/2020 |
| JP | H11-230298 | A | 8/1999 |
| JP | 2007-225024 | A | 9/2007 |
| JP | 2017-141871 | A | 8/2017 |
| TW | 544164 | B | 8/2016 |

OTHER PUBLICATIONS

Aug. 23, 2021 Written Opinion issued in International Patent Application No. PCT/CN2021/093414.
Jun. 3, 2021 Office Action issued in Chinese Patent Application No. 202010961134.5.

\* cited by examiner

MAGNETIC LEVITATION BALL SCREW PAIR

TECHNICAL FIELD

The present disclosure relates to the field of ball screw technologies, and specifically, to a magnetic levitation ball screw pair.

BACKGROUND

The statements herein merely provide the background art related to the present disclosure, and do not necessarily constitute the prior art.

As the equipment manufacturing industry is developing toward extreme manufacturing of high-end precision equipment, there is an urgent need of highly reliable core transmission components. As an efficient and energy-saving transmission and positioning element, the ball screw pair is more widely applied to numerical control equipment, but the contact wear of the ball screw pair easily causes a decrease in precision and deterioration of the pre-tightening force.

It is found that in a conventional ball screw pair, a load is transmitted by mainly relying on balls between the screw raceway and the nut raceway, and the pre-tightening force of the conventional ball screw pair is realized using a gasket. After the ball screw pair is used for a long time, the raceways or the balls may be worn. However, it is difficult to determine the amount of wear. If the pre-tightening force is not adjusted in time or is only coarsely adjusted manually, the load-carrying capacity of the ball screw pair is affected, which in turn affects the machining precision of heavy-duty numerical control equipment.

In addition, the axes of the working nut, the pre-tightening nut, and the screw may not coincide during mounting, which easily results in positioning errors.

SUMMARY

An objective of the present disclosure is to provide a magnetic levitation ball screw pair, to at least resolve one of the foregoing technical problems.

To achieve the foregoing objective, the following technical solutions are used in the present disclosure: A magnetic levitation ball screw pair is provided, including a screw, a working nut, and a pre-tightening nut. Inner walls of screw holes in the working nut and the pre-tightening nut are provided with sensor groups including a plurality of displacement sensors, the displacement sensor is capable of measuring a value of a gap between the inner wall of the screw hole and an outer wall of the screw in a diameter direction of the screw hole, the sensor group includes four displacement sensors evenly distributed in a circumferential direction of the screw hole, every two displacement sensors are used in pairs and are symmetrical about a center axis of the screw hole, and projections of a plurality of sensor groups in an axial direction of the screw overlap; and an adaptive excitation coil is mounted to each displacement sensor, the excitation coil is capable of attracting the screw in a measurement direction of the adaptive displacement sensor, and a magnetic force of the excitation coil attracting the screw is adjustable to change the value of the gap, so that axes of the screw, the working nut, and the pre-tightening nut coincide.

As a further improvement, a first annular excitation coil is fixedly sleeved on an outer circle of the working nut close to one end of the pre-tightening nut, and a second annular excitation coil is fixedly sleeved on the outside of the first annular excitation coil; and a third annular excitation coil is fixedly sleeved on an outer circle of the pre-tightening nut close to one end of the working nut, and a fourth annular excitation coil is fixedly sleeved on the outside of the third annular excitation coil.

As a further improvement, an annular pressure sensor is mounted between the second annular excitation coil and the fourth annular excitation coil, and the annular pressure sensor is capable of measuring a pre-tightening force between the second annular excitation coil and the fourth annular excitation coil.

The Foregoing One or More Technical Solutions have the Following Beneficial Effects:

In the present disclosure, an axial magnetic levitation force may be generated by relying on cooperation among a first annular excitation coil, a second annular excitation coil, a third annular excitation coil, a fourth annular excitation coil, and an annular pressure sensor, to balance an axial working load, thereby reducing a load-carrying effect of balls, reducing a wear effect between the balls and raceways, and enhancing a guiding effect of the balls. As the ball screw pair runs for a long time, deterioration of a pre-tightening force is caused due to wear between the balls and the raceways, and the pre-tightening force between a working nut and a pre-tightening nut may alternatively be adjusted by controlling currents in the annular excitation coils.

A gap between a screw and a nut is detected by using a displacement sensor, and radial and transverse magnetic levitation forces are controlled by controlling the currents in the excitation coils to adjust radial and transverse gaps at cross sections, to avoid positioning errors caused by non-parallel axes of the nut and the screw.

To avoid a short-circuit failure of the excitation coils, the first annular excitation coil and the third annular excitation coil are used in pairs, and the second annular excitation coil and the fourth annular excitation coil are used in pairs cooperatively. That is, two pairs of annular excitation coils are used cooperatively; and when one pair of the pairs of annular excitation coils fails, strength of a magnetic field is weakened, but no excitation failure is caused, thereby improving the excitation reliability.

BRIEF DESCRIPTION OF THE DRAWINGS

The accompanying drawings constituting a part of the present disclosure are used to provide further understanding of the present disclosure. Schematic embodiments of the present disclosure and descriptions thereof are used to explain the present disclosure, and do not constitute a limitation to the present disclosure.

Figure 1:
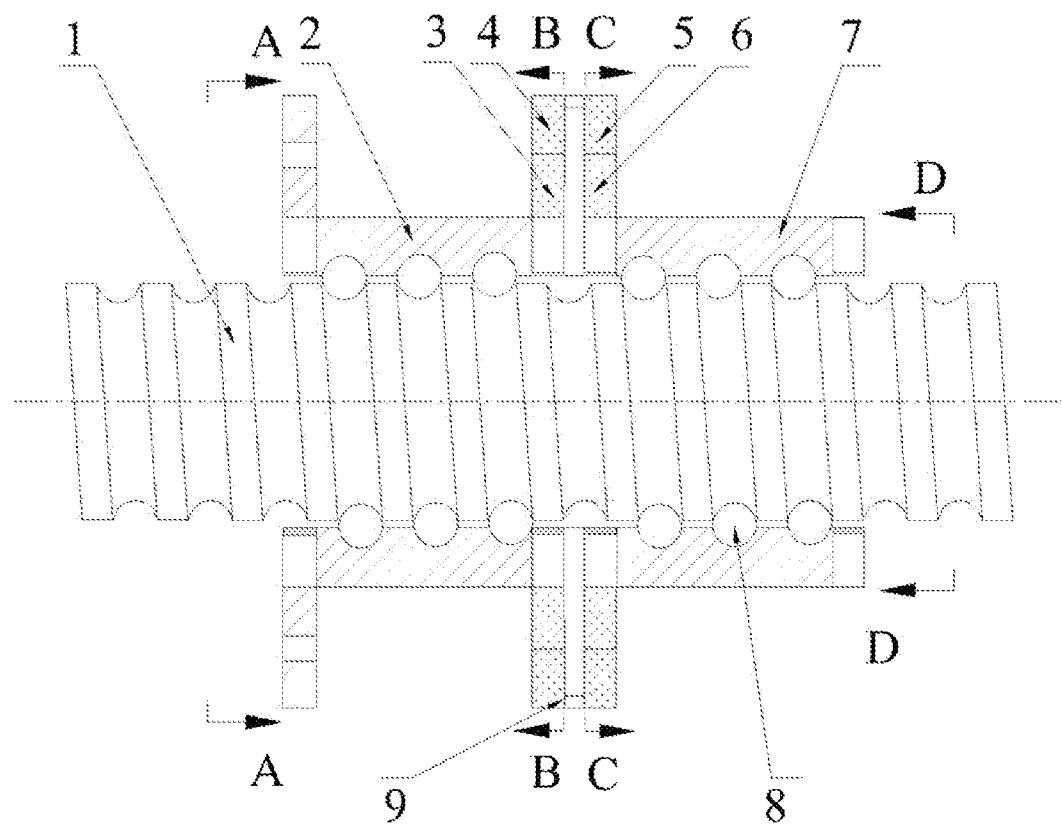
FIG. 1 is a schematic cross-sectional view of an overall structure according to an embodiment of the present disclosure.

In the figures: 1. screw; 2. working nut; 3. first annular excitation coil; 4. second annular excitation coil; 5. fourth annular excitation coil; 6. third annular excitation coil; 7. pre-tightening nut; 8. ball; 9. annular pressure sensor; 10. first transverse displacement sensor; 11. first radial displacement sensor; 12. first radial excitation coil; 13. second transverse displacement sensor; 14. second transverse excitation coil; 15. second radial displacement sensor; 16. second radial excitation coil; 17. first transverse excitation coil; 18. third transverse displacement sensor; 19. third radial displacement sensor; 20. third radial excitation coil; 21. fourth transverse displacement sensor; 22. fourth transverse excitation coil; 23. fourth radial displacement sensor; 24. fourth radial excitation coil; 25. third transverse excitation coil; 26. fifth transverse displacement sensor; 27. fifth radial displacement sensor; 28. fifth radial excitation coil; 29. sixth transverse displacement sensor; 30. sixth transverse excitation coil; 31. sixth radial displacement sensor; 32. sixth radial excitation coil; 33. fifth transverse excitation coil; 34. seventh transverse displacement sensor; 35. seventh radial displacement sensor; 36. seventh radial excitation coil; 37. eighth transverse displacement sensor; 38. eighth transverse excitation coil; 39. eighth radial displacement sensor; 40. eighth radial excitation coil; and 41. seventh transverse excitation coil.

DETAILED DESCRIPTION

It should be noted that the following detailed descriptions are all exemplary and are intended to provide a further description of the present disclosure. Unless otherwise specified, all technical and scientific terms used herein have the same meaning as commonly understood by a person of ordinary skill in the art to which the present disclosure belongs.

It should be noted that terms used herein are only for describing specific implementations and are not intended to limit exemplary implementations according to the present disclosure. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

For convenience of description, the words "above", "below", "left", and "right" appearing in the present disclosure only indicate directions consistent with the above, below, left, and right directions of the accompanying drawings, are not intended to limit the structure, and are used only for ease of describing the present disclosure and brevity of description, rather than indicating or implying that the mentioned device or element needs to have a particular orientation or be constructed and operated in a particular orientation. Therefore, such terms cannot be construed as a limitation on the present disclosure.

Figure 2:
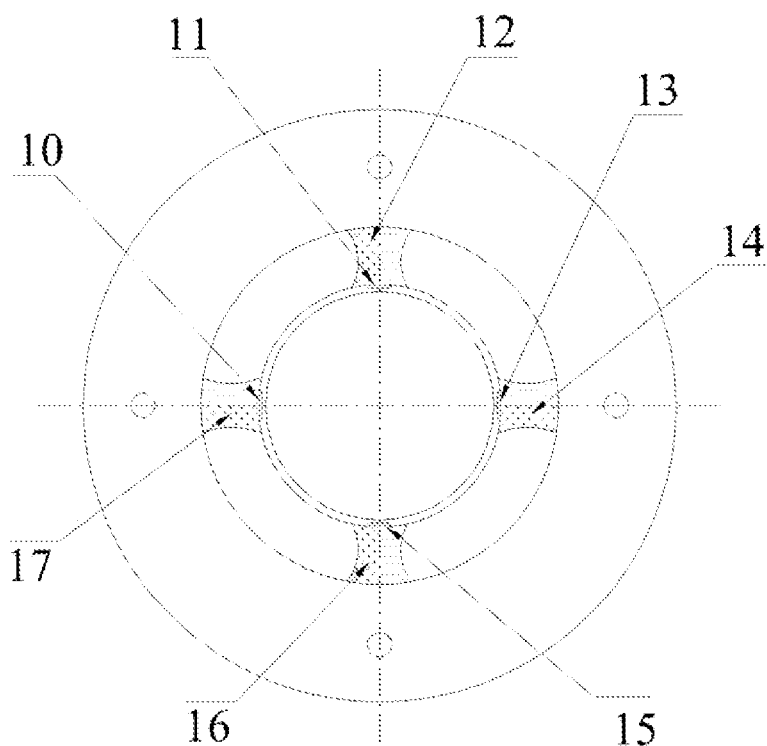
FIG. 2 is a schematic structural diagram in an A-A view direction in FIG. 1.
Figure 3:
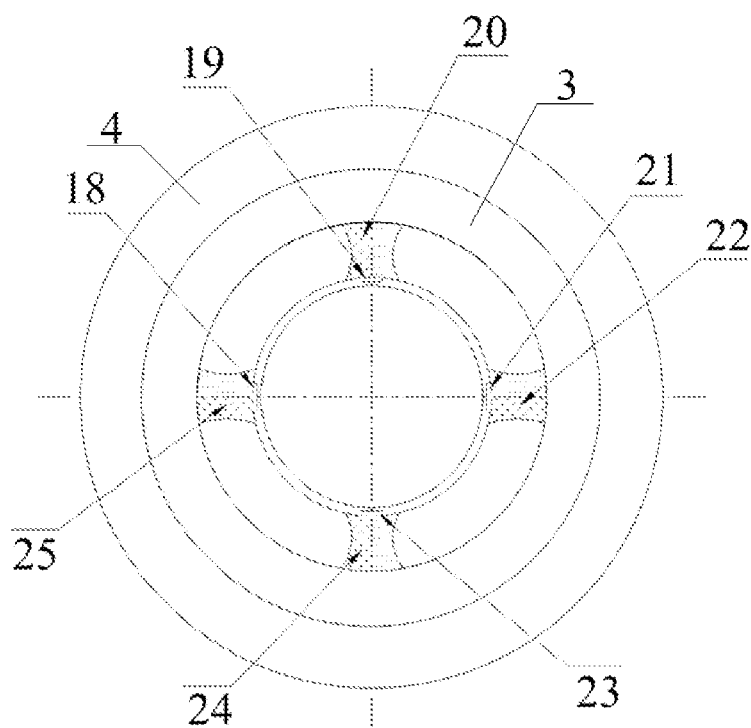
FIG. 3 is a schematic structural diagram in a B-B view direction in FIG. 1.
Figure 4:
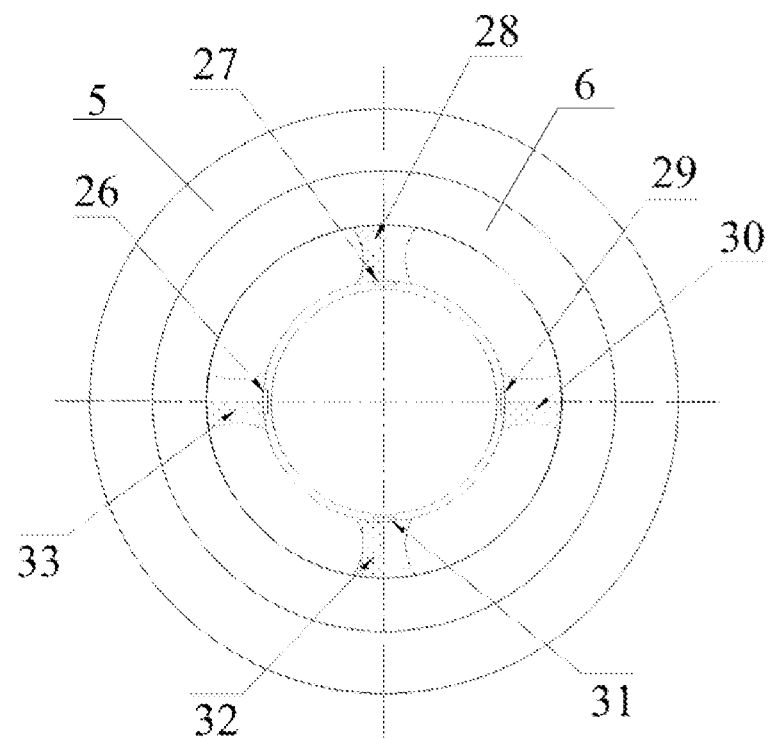
FIG. 4 is a schematic structural diagram in a C-C view direction in FIG. 1.
Figure 5:
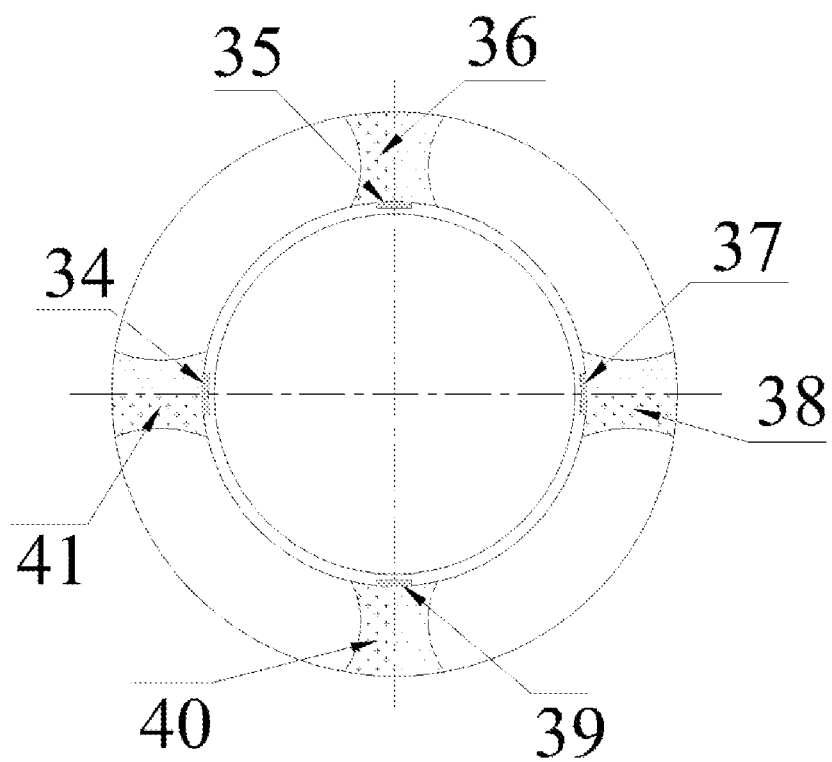
FIG. 5 is a schematic structural diagram in a D-D view direction in FIG. 1.

In a typical implementation of the present disclosure, as shown in FIG. 1 to FIG. 5, an embodiment provides a magnetic levitation ball screw pair, including a screw 1, a working nut 2, and a pre-tightening nut 7. An outer wall surface of the screw 1 and inner wall surfaces of the working nut 2 and the pre-tightening nut 7 separately have raceways, and balls 8 are disposed in the raceways. Inner walls of screw holes in the working nut 2 and the pre-tightening nut 7 are provided with sensor groups including a plurality of displacement sensors, the displacement sensor is capable of measuring a value of a gap between the inner wall of the screw hole and an outer wall of the screw 1 in a diameter direction of the screw hole, the sensor group includes four displacement sensors evenly distributed in a circumferential direction of the screw hole, every two displacement sensors are used in pairs and are symmetrical about a center axis of the screw hole, and projections of a plurality of sensor groups in an axial direction of the screw 1 overlap; and an adaptive excitation coil is mounted to each displacement sensor, the excitation coil is capable of attracting the screw 1 in a measurement direction of the adaptive displacement sensor, and a magnetic force of the excitation coil attracting the screw 1 is adjustable to change the value of the gap, so that axes of the screw 1, the working nut 2, and the pre-tightening nut 7 coincide. The excitation coil is nested in a side wall of the pre-tightening nut 7 or the working nut 2.

Specifically, the sensor group includes a transverse displacement sensor I, a transverse displacement sensor II, a longitudinal displacement sensor I, and a longitudinal displacement sensor II; and each sensor group is adaptively equipped with a transverse excitation coil I, a transverse excitation coil II, a longitudinal excitation coil I, and a longitudinal excitation coil II, and measurement directions of the transverse displacement sensor I and the transverse displacement sensor II are perpendicular to measurement directions of the longitudinal displacement sensor I and the longitudinal displacement sensor II.

It may be understood that, the transverse excitation coil I and the transverse excitation coil II can provide electromagnetic attractions with opposite directions in a same straight line, and magnitudes of magnetic forces at the two transverse excitation coils are further adjusted by adjusting magnitudes of currents, so that the transverse excitation coil I and the transverse excitation coil II have different degrees of attraction to the screw until the transverse gaps on two sides are the same. The longitudinal excitation coil I and the longitudinal excitation coil II have the same principle of adjusting radial gaps, and details are not described herein again.

It may be understood that, in this embodiment, the four sensors in each sensor group are evenly distributed in the circumferential direction of the screw hole; the measurement directions of the transverse displacement sensor I and the transverse displacement sensor II are perpendicular to the measurement directions of the longitudinal displacement sensor I and the longitudinal displacement sensor II; the two transverse displacement sensors adjust the screw to the left and right in a transverse direction, so that in a process of adjusting the transverse gaps on the two sides, longitudinal gaps on two sides are not affected; similarly, the two longitudinal displacement sensors attract the screw up and down in a longitudinal direction, without affecting transverse gaps on two sides; and therefore, the concentric adjustment among the screw, the working nut, and the pre-tightening nut can be completed.

In this embodiment, there are two sensor groups in each of the working nut 2 and the pre-tightening nut 7, and the sensor groups are respectively located at two ends of the working nut 2 or two ends of the pre-tightening nut 7. In different sensor groups, a plurality of transverse displacement sensors I are arranged in a column in an axial direction of the screw 1, a plurality of transverse displacement sensors II are arranged in a column in the axial direction of the screw 1, a plurality of longitudinal displacement sensors I are arranged in a column in the axial direction of the screw 1, and a plurality of longitudinal displacement sensors II are arranged in a column in the axial direction of the screw 1.

Specifically, there are a first transverse displacement sensor 10, a first radial displacement sensor 11, a second transverse displacement sensor 13, a second radial displacement sensor 15, a first transverse excitation coil 17, a second transverse excitation coil 14, a first radial excitation coil 12, and a second radial excitation coil 16 at an A-A cross section of the working nut 2.

There are a third transverse displacement sensor 18, a fourth transverse displacement sensor 21, a third radial displacement sensor 19, a fourth radial displacement sensor 23, a third transverse excitation coil 25, a fourth transverse excitation coil 22, a third radial excitation coil 20, and a fourth radial excitation coil 24 at a B-B cross section of the working nut 2.

There are a fifth transverse displacement sensor 26, a sixth transverse displacement sensor 29, a fifth radial displacement sensor 27, a sixth radial displacement sensor 31, a sixth transverse excitation coil 30, a fifth radial excitation coil 28, a sixth radial excitation coil 32, and a fifth transverse excitation coil 33 at a C-C cross section of the pre-tightening nut 7.

There are a seventh transverse displacement sensor 34, an eighth transverse displacement sensor 37, a seventh radial displacement sensor 35, an eighth radial displacement sensor 39, a seventh transverse excitation coil 41, an eighth transverse excitation coil 38, a seventh radial excitation coil 36, and an eighth radial excitation coil 40 at a D-D cross section of the pre-tightening nut 7.

In this embodiment, a first annular excitation coil 3 is fixedly sleeved on an outer circle of the working nut 2 close to one end of the pre-tightening nut 7, and a second annular excitation coil 4 is fixedly sleeved on the outside of the first annular excitation coil 3; and a third annular excitation coil 6 is fixedly sleeved on an outer circle of the pre-tightening nut 7 close to one end of the working nut 2, and a fourth annular excitation coil 5 is fixedly sleeved on the outside of the third annular excitation coil 6.

An annular pressure sensor 9 is mounted between the second annular excitation coil 4 and the fourth annular excitation coil 5, and the annular pressure sensor 9 is capable of measuring a pre-tightening force between the second annular excitation coil 4 and the fourth annular excitation coil 5. In this embodiment, the first annular excitation coil 3 has the same specification as the third annular excitation coil 6, and the second annular excitation coil 4 has the same specification as the fourth annular excitation coil 5.

It may be understood that, to control the gap and the pre-tightening force, this embodiment should further include a controller. The controller is capable of reading the value of the gap measured by the displacement sensor, and adjusting a magnitude of a current in the adaptive excitation coil, until values of gaps measured by two displacement sensors used in pairs are equal; and the controller is capable of reading a value of the annular pressure sensor 9, and adjusting currents in the first annular excitation coil, the second annular excitation coil 4, the third annular excitation coil 6, and the fourth annular excitation coil 5, until the pre-tightening force measured by the annular pressure sensor 9 meets a set magnitude range.

It may be understood that, to supply power to the excitation coils and the annular excitation coils, this embodiment should further include a power supply. The power supply is capable of separately supplying power to different excitation coils and annular excitation coils, and an output of the power supply is controllable by the controller.

Working Principle:

Two groups of annular excitation coils are respectively a first annular excitation coil 3, a second annular excitation coil 4, a third annular excitation coil 6, and a fourth annular excitation coil 5, and generate an axial magnetic levitation force, strength of a magnetic field determines a magnitude of a pre-tightening force between a working nut and a pre-tightening nut 7, and the magnitude of the pre-tightening force may be measured by an annular pressure sensor 9.

When an axial working load is applied to the working nut 2, the strength of the magnetic field may be controlled by controlling magnitudes of currents in the two groups of annular excitation coils, to control the magnetic levitation force to balance the axial working load, thereby weakening a load-carrying effect of balls 8. In this case, the balls 8 between a screw 1 and the working nut 2 or the pre-tightening nut 7 mainly play a guiding role.

At an A-A cross section of the working nut 2, a first transverse displacement sensor 10 and a second transverse displacement sensor 13 detect a transverse gap between the working nut 2 and the screw 1 at the A-A cross section, and transverse gaps on two sides of the screw 1 are controlled by a first transverse excitation coil 17 and a second transverse excitation coil 14. A first radial displacement sensor 11 and a second radial displacement sensor 15 detect a radial gap between the working nut 2 and the screw 1 at the A-A cross section, and radial gaps on two sides of the screw 1 are controlled by a first radial excitation coil 12 and a second radial excitation coil 16.

At a B-B cross section of the working nut 2, a third transverse displacement sensor 18 and a fourth transverse displacement sensor 21 detect a transverse gap between the working nut 2 and the screw 1 at the B-B cross section, and transverse gaps on two sides of the screw 1 are controlled by a third transverse excitation coil 25 and a fourth transverse excitation coil 22. A third radial displacement sensor 19 and a fourth radial displacement sensor 23 detect a radial gap between the working nut 2 and the screw 1 at the B-B cross section, and radial gaps on two sides of the screw 1 are controlled by a third radial excitation coil 20 and a fourth radial excitation coil 24.

At a C-C cross section of the pre-tightening nut 7, a fifth transverse displacement sensor 26 and a sixth transverse displacement sensor 29 detect a transverse gap between the pre-tightening nut 7 and the screw 1 at the C-C cross section, and transverse gaps on two sides of the screw 1 are controlled by a fifth transverse excitation coil 33 and a sixth transverse excitation coil 30. A fifth radial displacement sensor 27 and a sixth radial displacement sensor 31 detect a radial gap between the pre-tightening nut 7 and the screw 1 at the C-C cross section, and radial gaps on two sides of the screw 1 are controlled by a fifth radial excitation coil 28 and a sixth radial excitation coil 32.

At a D-D cross section of the pre-tightening nut 7, a seventh transverse displacement sensor 34 and an eighth transverse displacement sensor 37 detect a transverse gap between the pre-tightening nut 7 and the screw 11 at the D-D cross section, and transverse gaps on two sides of the screw 1 are controlled by a seventh transverse excitation coil 41 and an eighth transverse excitation coil 38. A seventh radial displacement sensor 35 and an eighth radial displacement sensor 39 detect a radial gap between the pre-tightening nut 7 and the screw 1 at the D-D cross section, and radial gaps on two sides of the screw 1 are controlled by a seventh radial excitation coil 36 and an eighth radial excitation coil 40.

The specific implementations of the present disclosure are described above with reference to the accompanying drawings, but are not intended to limit the protection scope of the present disclosure. A person skilled in the art should understand that various modifications or transformations may be made without creative efforts based on the technical solutions of the present disclosure, and such modifications or transformations shall fall within the protection scope of the present disclosure.

What is claimed is:

1. A magnetic levitation ball screw pair, comprising:
a working nut, a pre-tightening nut, a screw passing through a screw hole of the working nut and a screw hole of the pre-tightening nut, and balls disposed in raceways provided on an outer wall surface of the screw, an inner wall surface of the working nut, and an inner wall surface of the pre-tightening nut, wherein a plurality of first gaps are defined between the outer wall surface of the screw and the inner wall surface of the working nut, and a plurality of second gaps are defined between the outer wall surface of the screw and the inner wall surface of the pre-tightening nut;
a first adaptive excitation coil group comprising four adaptive excitation coils evenly distributed in a circumferential direction of the screw hole of the working nut, at a first end of the working nut, the four adaptive excitation coils being arranged in two pairs, the adaptive excitation coils of each pair being 180° apart from one another, a magnetic force of each adaptive excitation coil attracting the screw along a radial direction of the screw hole of the working nut and being adjustable;
a first displacement sensor group comprising four displacement sensors, each displacement sensor being arranged at a position corresponding to a respective one of the adaptive excitation coils of the first adaptive excitation coil group, and being positioned for measurement of a respective one of the first gaps;
a second adaptive excitation coil group, comprising four adaptive excitation coils evenly distributed in the circumferential direction of the screw hole of the working nut, at a second end of the working nut, the four adaptive excitation coils being arranged in two pairs, the adaptive excitation coils of each pair being 180° apart from one another, a magnetic force of each adaptive excitation coil attracting the screw along a radial direction of the screw hole of the working nut and being adjustable;
a second displacement sensor group comprising four displacement sensors, each displacement sensor being arranged at a position corresponding to a respective one of the adaptive excitation coils of the second adaptive excitation coil group, and being positioned for measurement of a respective one of the first gaps;
a third adaptive excitation coil group comprising four adaptive excitation coils evenly distributed in a circumferential direction of the screw hole of the pre-tightening nut, at a first end of the pre-tightening nut, the four adaptive excitation coils being arranged in two pairs, the adaptive excitation coils of each pair being 180° apart from one another, a magnetic force of each adaptive excitation coil attracting the screw along a radial direction of the screw hole of the pre-tightening nut and being adjustable;
a third displacement sensor group comprising four displacement sensors, each displacement sensor being arranged at a position corresponding to a respective one of the adaptive excitation coils of the third adaptive excitation coil group, and being positioned for measurement of a respective one of the second gaps;
a fourth adaptive excitation coil group comprising four adaptive excitation coils evenly distributed in the circumferential direction of the screw hole of the pre-tightening nut, at a second end of the pre-tightening nut, the four adaptive excitation coils being arranged in two pairs, the adaptive excitation coils of each pair being 180° apart from one another, a magnetic force of each adaptive excitation coil attracting the screw along a radial direction of the screw hole of the pre-tightening nut and being adjustable;
a fourth displacement sensor group comprising four displacement sensors, each displacement sensor being arranged at a position corresponding to a respective one of the adaptive excitation coils of the fourth adaptive excitation coil group, and being positioned for measurement of a respective one of the second gaps;
a first annular excitation coil fixedly sleeved on an outside of an end of the working nut that faces the pre-tightening nut;
a second annular excitation coil fixedly sleeved on an outside of the first annular excitation coil;
a third annular excitation coil fixedly sleeved on an outside of an end of the pre-tightening nut that faces the working nut; and
a fourth annular excitation coil fixedly sleeved on an outside of the third annular excitation coil.

2. The magnetic levitation ball screw pair according to claim 1, wherein an annular pressure sensor is mounted between the second annular excitation coil and the fourth annular excitation coil, and the annular pressure sensor is capable of measuring a pre-tightening force between the second annular excitation coil and the fourth annular excitation coil.

3. The magnetic levitation ball screw pair according to claim 1, wherein the four adaptive excitation coils in each adaptive excitation coil group comprise a first transverse excitation coil and a second transverse excitation coil 180° apart from one another, and a first longitudinal excitation coil and a second longitudinal excitation coil 180° apart from one another, and the four displacement sensors of each displacement sensor group comprise a first transverse displacement sensor, a second transverse displacement sensor, a first longitudinal displacement sensor, and a second longitudinal displacement sensor.

4. The magnetic levitation ball screw pair according to claim 1, wherein the adaptive excitation coils are nested in side walls of the pre-tightening nut and the working nut.

5. A system, comprising:
the magnetic levitation ball screw pair according to claim 1, and
a power supply that supplies power to the adaptive excitation coils and the annular excitation coils.

6. A system, comprising:
the magnetic levitation ball screw pair according to claim 1, and
a controller that receives measurements of the first gaps and the second gaps from the displacement sensors, and adjusts a magnitude of current in the adaptive excitation coils.

* * * * *